Oct. 23, 1956　　　R. A. HIGONNET ET AL　　　2,767,628
PHOTOGRAPHIC COMPOSING APPARATUS

Filed May 11, 1953　　　　　　　　　　　　　　4 Sheets-Sheet 2

*INVENTORS*
RENÉ A. HIGONNET
LOUIS M. MOYROUD

BY Kenway, Jenney, Witter
  & Hildreth

ATTORNEYS

Oct. 23, 1956 R. A. HIGONNET ET AL 2,767,628
PHOTOGRAPHIC COMPOSING APPARATUS
Filed May 11, 1953
4 Sheets-Sheet 4

INVENTORS
RENÉ A. HIGONNET
LOUIS M. MOYROUD
BY Kenway, Jenney, Witter
+ Hildreth
ATTORNEYS United States Patent Office 2,767,628
Patented Oct. 23, 1956

2,767,628

PHOTOGRAPHIC COMPOSING APPARATUS

René A. Higonnet and Louis M. Moyroud, Cambridge, Mass., assignors to Graphic Arts Research Foundation, Inc., Cambridge, Mass., a corporation of Delaware Application May 11, 1953, Serial No. 354,162

Claims priority, application Great Britain June 9, 1952

13 Claims. (Cl. 95—4.5)

The present invention relates to photographic type composing apparatus. More particularly, it relates to apparatus employing continuously rotating mechanisms and means for photographing selected characters from a group or font to be annularly disposed upon a suitable support, and to a method for preparing such a support.

In our copending applications, Serial No. 610,336, filed August 11, 1945, and Serial No. 770,320, filed August 23, 1947, we have described photographic type composing apparatus in which a continuously rotating mechanism moves the characters successively through a projection position, and each character selected for projection is illuminated by an intermittent flash device of a suitable type, the illumination being of extremely short duration as compared to the time of passage of a single character through the projection position. The principle of this apparatus has been termed the "stop-motion flash" or "stroboscopic flash" principle, and depends upon the flash being of such short duration that the movement of the character, although continuous, is nevertheless negligible during the interval of exposure. One of the important advantages derived from this arrangement resides in the increase in speed over composing devices based upon intermittently moving mechanisms for presenting the selected characters in the projection position. On the other hand, a definite relationship is involved between the speed of the character bearing member and the permissible duration of the exposure. This relationship may be subject, under certain circumstances, to transient line voltage conditions, aging of the intermittent flash device, and other phenomena.

A principal object of the present invention is to provide apparatus similar to that described in said applications, in that it employs continuously rotating mechanisms for causing the characters to pass consecutively through the projection position, but different from said apparatus, in that the projection means has an appreciably longer exposure time than that employed in said applications, and wherein provision is made to compensate for the relatively greater motion of each character during exposure.

Another object is to provide a machine of extremely quiet operation and considerable speed suitable for operation by a skilled typist in a typical office environment.

Another object is to provide a machine in which the definition of the projected character images is not related to the speed of the rotating mechanisms as in said applications.

Another object is to provide suitable means to effect a selection of the particular characters to be projected or photographed, said means to be controlled directly or indirectly by a keyboard.

Another object is to provide a composing machine suitable for use in conjunction with a keyboard and registering, justifying, and projection spacing devices of the general type described in said applications.

Another object is to provide a suitable method for preparing the character support to insure proper alignment of the characters projected therefrom in spite of inaccuracies in the mounting of the optical means associated therewith.

With the above objects in view, one feature of the present invention resides in the use of character projection apparatus including a support for a plurality of lenses, there being one lens associated with each selectable character.

Another feature resides in the use of optical compensating means whereby an image of the character to be projected is formed in the axis of rotation of a mechanism by which the characters are moved consecutively and continuously through the projection axis, and this image is refocused onto the sensitized surface upon which the text is to be composed.

Another feature resides in the provision of structure including the foregoing character projection apparatus in combination with decoding means, controlled directly or indirectly by a keyboard, for selecting the characters for consecutive projection.

According to still another feature, in one embodiment of the invention a so-called "dove prism" is placed in the projection axis and rotated continuously to eliminate a component of motion of a character image formed in the projection apparatus, whereby a steady image is formed on the surface upon which the text is to be composed.

Other features of the invention relate to certain features of construction, modes of operation, methods, structures and relationships which will be more clearly understood by reference to the following detailed description thereof, and which are specifically defined in the claims.

Figure 1:
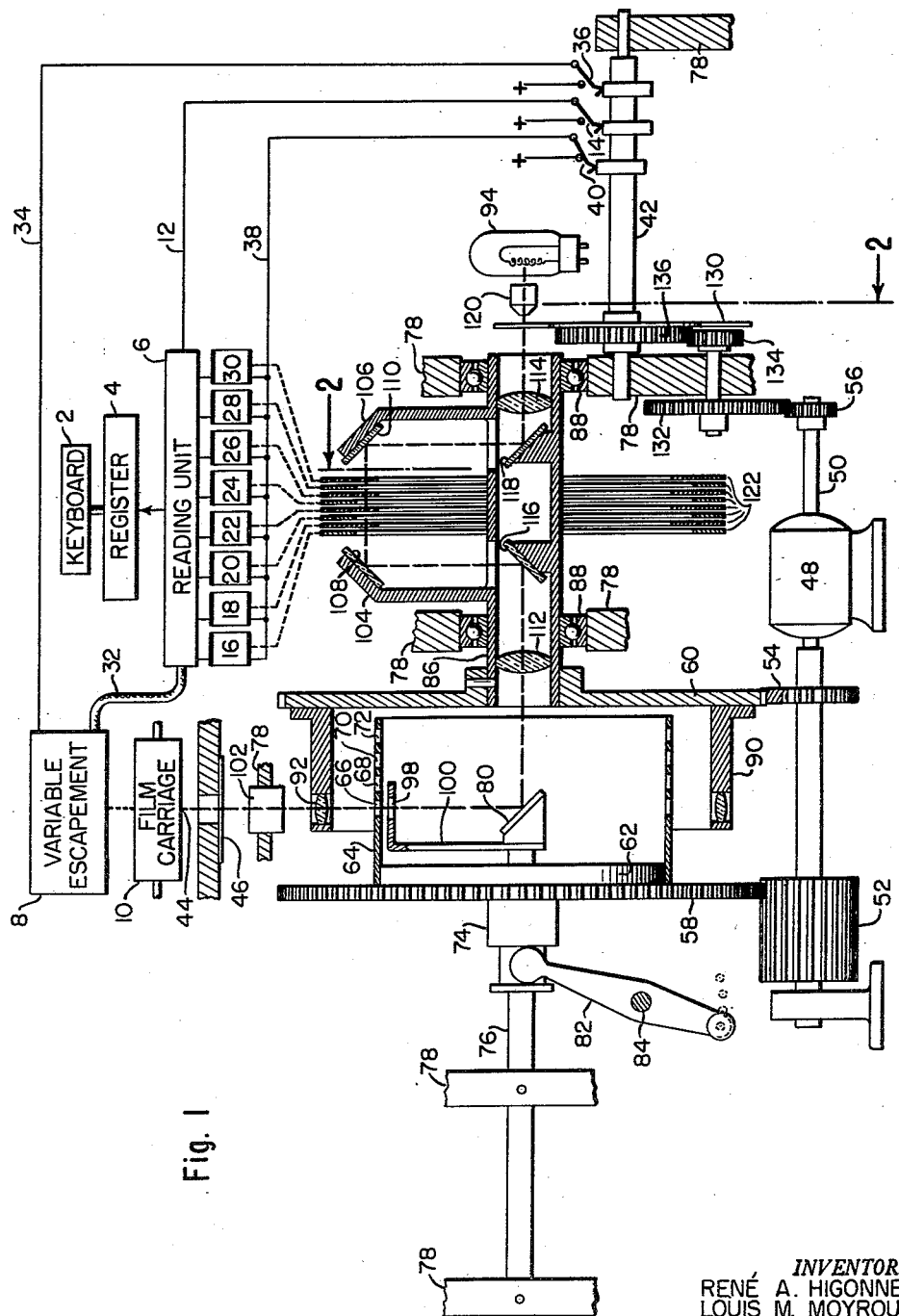
Fig. 1 is a side elevation, partly in section, of type composing apparatus incorporating one embodiment of the invention, said drawing also representing diagrammatically the relationship between said apparatus and the other components of a type composing machine.
Figure 2:
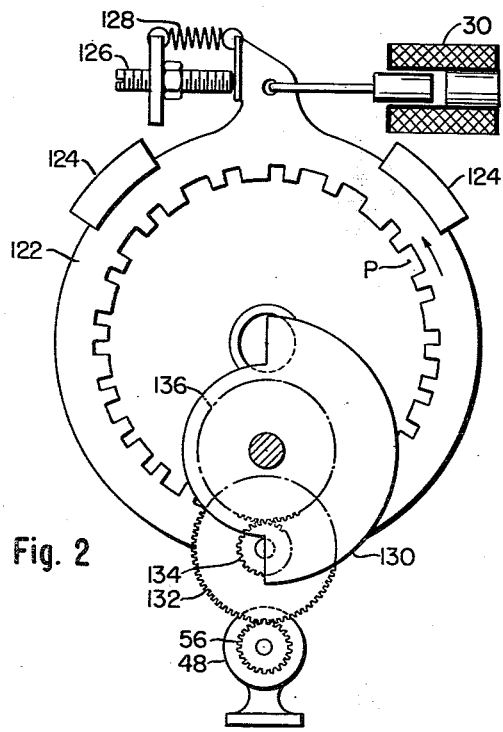
Fig. 2 is an end elevation of the apparatus of Fig. 1, taken on line 2—2 thereof.

Referring to Figs. 1 and 2, a photographic composing machine embodying the present invention will be described. A keyboard 2, register 4, reading unit 6, variable escapement 8, and film carriage 10 may be constructed and interconnected generally in accordance with the detailed descriptions in said applications Serial Nos. 610,336 and 770,320, or in any other manner suitable for the projection apparatus herein described. It is immaterial to the present invention whether the register 4 is included in the apparatus, or whether instead the keyboard 2 is used to control the projection apparatus directly. It is also immaterial whether the film carriage 10 is itself displaced by the variable escapement 8 as described in said applications, or whether other means are used to displace the characters on the film, for example, as described in the copending application of Caldwell, Serial No. 148,901, filed March 10, 1950, now Patent No. 2,670,665.

To summarize the operation of the machine, a line to be photographically composed is first typed on the keyboard 2 the keyboard being provided with permutation bars such as are used in teletypesetters or the like, or with other suitable encoding means. The permutation bars or equivalent encoding means are connected with the register 4 for storage of the entire line prior to the initiation of its actual projection. The delay introduced by the register is necessary for the justification of the lines, as is well understood in the art. The register may take many different forms, but may be assumed for present purposes to consist of a flat, stationary bed of pins arranged in rows and columns as generally described in said application Serial No. 770,320. There is a column of pins for each character in a line of type, and eight pins in each column, each pin having a depressed and a retracted position. The pins provide means for recording a distinct binary code designation for each character selected at the keyboard 2. The register 4 has a hammer carriage which advances from column to column of the pins, said carriage having a hammer opposite each pin in a single column.

The reading unit 6 includes a reading carriage adapted to be advanced independently of the hammer carriage by a ratchet and pawl device, said device being electromagnetically actuated upon application of a suitable voltage to a lead 12 connected with a cam-operated switch 14. The mechanism is arranged in a well known manner so that the carriage advances when the voltage on the lead 12 is removed.

Eight sensing devices supported on the reading carriage sense the positions of the pins in one column of the register at a time, and connect a voltage source with a corresponding combination of eight leads connected therewith. These leads are connected, either directly or through suitable holding magnets, not shown, with a set of eight electromagnets 16 to 30 which are associated with the projection apparatus, and are also connected with a cable 32 leading to the variable escapement 8. The variable escapement is mechanically connected with the film carriage, and is arranged to advance the film carriage in the time interval between character projections by a distance corresponding to the width of the character previously projected, as fully described in said applications. The circuit for operating the variable escapement is completed through a lead 34 connected with a cam-operated switch 36.

The circuit for the electromagnets 16 to 30 is similarly completed through a lead 38 connected with a cam-operated switch 40.

Figure 3:
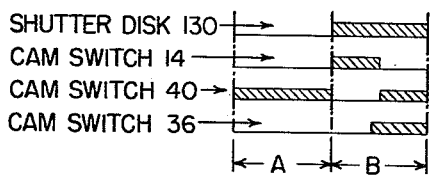
Fig. 3 is a timing diagram relating to the operation of the apparatus of Fig. 1.

The timing of the cam-operated switches may be seen more clearly with reference to Fig. 3. This figure has a horizontal time axis divided into two equal periods A and B, each of these periods corresponding to one revolution of the shaft 42 upon which the respective cams are secured. At the start of the period A the switch 40 is in the closed position, and the electromagnets 16 to 30 corresponding to the momentary position of the reading unit on the register are energized to set up the projection apparatus for a selected character in a manner hereinafter to be more fully described. The projection of the character occurs at some time in the period A. At the end of the period A the switch 40 opens and the switch 14 closes, thereby energizing the electromagnet for advancing the reading unit to its next position. However, as mentioned above the ratchet and pawl advancement device is of the type which does not produce an advancement until the voltage is removed later in the period B by the opening of the switch 14. Prior to this time the switch 36 closes, thereby completing the circuit to the variable escapement 8 and producing an advancement of the film carriage corresponding to the character which has just been read and projected. As soon as the cam switch 14 is opened, the reading unit advances to the next position and the switch 40 is again closed. Thus, a circuit is completed immediately for energizing the electromagnets 16 to 30, and these electromagnets are provided with a time interval corresponding approximately to half of the period B in which to reach their new positions. At the start of the period A the electromagnets will have completed their movements and will bring the projection apparatus into position for projecting the next character at any time within the succeeding period A.

It will thus be seen that an image of each character is formed at 44 during the time interval A by the projection apparatus, according to the particular combination of the electromagnets 16 to 30 which has been energized. A shutter 46 is preferably provided to prevent light from reaching the film when the machine is not in operation and during a short time after the end of the composition of each line and before the beginning of the composition of the succeeding line.

The character projection unit will next be described. This unit is driven by a continuously rotating motor 48 having a shaft 50 with three pinions 52, 54 and 56. The pinions 52 and 54 mesh, respectively, with gears 58 and 60 mounted coaxially but independently of one another. The gear 58 has a circular extended portion 62 facing the side of the gear 60. A character support or drum 64 is received over and securely fixed to this extended portion.

The drum 64 is provided with a number of annular rings of character transparencies 66 to 72, each ring corresponding to a particular style or font of type. The characters in each ring are spaced more or less evenly in a prearranged consecutive sequence hereinafter to be more fully described. The gear 58 is secured to a sleeve 74 rotatably received onto a fixed shaft 76 pinned to the frame 78 of the machine. The shaft 76 extends through the gear 58 to the inside of the drum 64, and supports a fixed reflector 80. It will be evident, of course, that the reflector 80 may be a mirror, a pentaprism, or any other equivalent reflecting device. A lever 82 rotatable about a fixed axis 84 has a rounded end portion received in an annular groove in the sleeve 74 to provide means for moving the gear 58 along the pinion 52 until a selected font is brought into the operative position, represented in the figure by the font 66.

The gear 60 is rigidly secured to a hollow shaft 86 rotatable in bearing 88 in the frame 78. The gear 60 has a flange 90 secured to the side facing the gear 58. The flange forms a support for a number of lenses 92, there being one lens for each character in any ring such as 66. The axis of each lens is substantially on the same radius with its corresponding character.

Thus, it will be seen that mechanism is provided for selecting a desired font or style of characters, and for rotating the character drum 64 and the lenses 92 in unison about the axis of the shaft 86. The light for projecting the characters is derived from a source of continuous illumination 94, which may be an incandescent lamp or any other suitable source. The light is projected along the axis of the shaft 86 and is interrupted by the decoder device, hereinafter more fully described, except for a period corresponding to the position of the drum 64 in which a selected character is in position to receive the light reflected from said axis by the reflector 80. For this interval the light is "gated" by the decoder to the reflector 80, and the character is projected in focus and with negligible distortion upon the film at 44, although the mechanism is continuously rotating, and although the exposure time is greatly in excess of that which is permissible in stop-motion photography.

Figure 4:
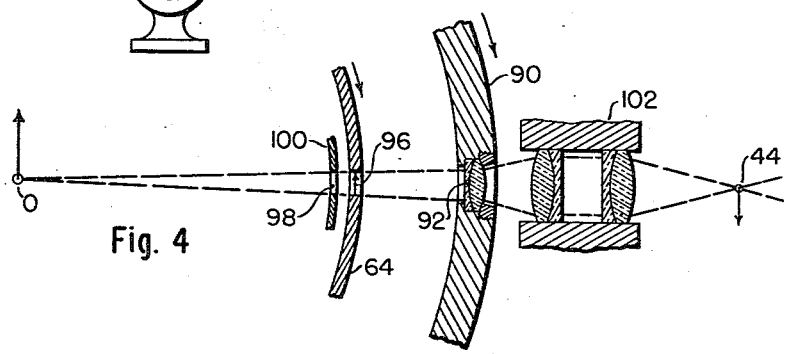
Fig. 4 is a fragmentary view of apparatus illustrating the principle of operation of the embodiment of Fig. 1.

The method for optically compensating for the motion of the projected characters may be understood by reference to Fig. 4. The point O represents a source of illumination located at the point of intersection of the surface of the reflector 80 and the axis of the shaft 86. The character drum 64 and the lens support 90 are assumed to be rotating continuously in the clockwise direction, and in unison. The light from the point O illuminates each character 96 as it moves opposite a window or aperture 98 in a fixed opaque shield 100. The aperture 98 is sufficiently narrow to prevent the illumination of more than one character at a time. Also, as explained at a later point, the aperture may be adjusted for the purpose of controlling the exposure time and the sharpness of the projected image. The position of the aperture may be considered as defining a unique radius in the circle of characters 96, and the rotating mechanism may similarly be considered as causing relative rotation about the axis at O between this radius and the circle of characters.

As a selected character 96 moves opposite the aperture 98, the source of light at O illuminates the transparency and the corresponding lens 92 forms a virtual image of the transparency passing through the point O. The lens combination 102 receives the light directed through the lens 92 and refocuses the image at O upon the sensitized film at 44. The lens 102 is stationary, and sees an image at the point O which is also stationary except for the rotation clockwise on an axis perpendicular to the plane of the figure caused by the motion of the character 96 and lens 92 during the exposure.

It should be noted that this motion of the image during the exposure is greatest at the point represented by the tip of the arrow. The component of this motion in a vertical direction as viewed in the figure is negligibly small, and the component in the horizontal direction, while relatively greater than that in the vertical direction, represents only a change in the horizontal distance between the virtual image and the lens 102. It will therefore be understood by those skilled in optics that sufficient depth of field should be provided to reduce the resultant blur to within tolerable limits.

Also, as indicated above, the aperture 98 may be reduced in the vertical dimension, as viewed in the figure, this being one means for increasing the depth of field for a given lens. If this dimension is made sufficiently small, the illumination of the image at 44 can be varied to meet the precise requirements for exposure of the film selected for use in the apparatus.

The light source at O is illuminated only during the period when the selected character passes in front of the aperture 98. Referring to Figs. 1 and 2, the continuous beam coming from the source 94 is interrupted by a disk decoder device of the type described in our copending application, Serial No. 353,882 filed May 8, 1953. The operation of this device will be briefly summarized.

The shaft 86 has two arms 104 and 106 rigidly secured thereto and supporting reflectors 108 and 110. Fixed to the inside of the shaft are a pair of lenses 112 and 114 and a pair of reflectors 116 and 118. The light from the source 94 is projected through an optical condenser 120 along the axis of the shaft 86. The beam passes through the lens 114, and strikes the reflectors 118, 110, 108 and 116 successively, finally passing through the lens 112 and striking the mirror 80. Thus, the segment of the beam between the reflectors 110 and 108 moves continuously parallel to itself around a circular path. Situated in a position to interrupt this section of the beam are a plurality of code disks 122. These disks are supported for limited rotation about the axis of the shaft 86 by fixed brackets 124 (Fig. 2) at their periphery. Each disk has a "normal" position resting against a stop 126, against which it is forced by a tension spring 128, and a "control" position which it reaches upon energization of the corresponding electromagnet such as 30. Each disk has a number of notches cut out from its inner edge, whereby upon energization of the appropriate combination of the electromagnets 16 to 30 the notches on each of the disks will become aligned at a particular position so that the beam, represented by the point P in Fig. 2 will pass through the disks when it reaches this position.

Preferably, the condenser 120 focuses an image of the filament of the lamp 94 in the plane of a shutter disk 130. The lens 114 refocuses this image at a point substantially in the middle of the stack of disks 122, that is, at a point in the beam midway between the reflectors 110 and 108. The lens 112 again refocuses this image upon the surface of the reflector 80. In this way the beam is kept from spreading and a large amount of light is permitted to pass through the notches in the code disks. Since the image of the filament is in focus on the reflector 80, sufficient illumination to project the characters is made available. It will be noted that this illumination is not required to be as brilliant as that employed in said applications disclosing the stop-motion flash technique, since here the duration of the exposure may be appreciably longer.

The pinion 56 on the motor shaft 50 is in mesh with a gear 132 rotatably supported in the frame 78. A pinion 134 is pinned to the same shaft with the gear 132, and is in mesh with a gear 136 pinned to the shaft 42. The shutter disk 130 is also secured to the shaft 42. The shaft 42 is driven at half the speed of the shaft 86. Referring again to Fig. 3, the period $A+B$ represents one revolution of the shaft 42 and two revolutions of the shaft 86. The shutter disk 130 is arranged to block the light beam during half of its revolution, corresponding to the period B. Thus, during this period no character will be projected.

It will be apparent that other types of decoders adapted to interrupt the light beam impinging on the reflector 80 in a corresponding manner may be substituted for that herein described. Thus, for example, the light source 94 may be turned on and off through a commutator type of decoder such as that described in said application, Serial No. 770,320. There are also many other types of decoder devices which may be adapted to cooperate with the projection means, as will be apparent to those skilled in this art.

Figure 5:
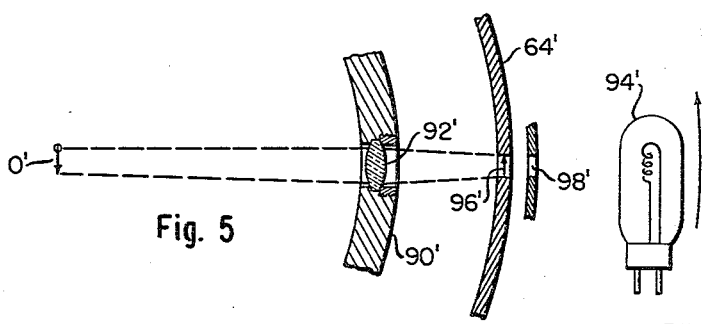
Fig. 5 is a view similar to Fig. 4, but illustrating the same principle in an alternative embodiment.

The optical system described with reference to Fig. 4 may be modified by providing mechanism for moving the parts which are there held stationary, and by holding fixed the parts which are rotating, thus producing the same relative motion between these parts. This arrangement is shown in Fig. 5. In this figure, a light source 94' rotates continuously about an axis O', and a character drum 64' and lens support 90' are held stationary. In contrast to the embodiment of Fig. 4, the character drum 64' is of greater diameter than the lens support 90'. The radius passing through the filament of the lamp 94' and the center O' is continuously revolving about the fixed character drum. When the selected character passes in front of an aperture 98' the corresponding lens 92' projects a real image of the character at the point O'. Since the film in the embodiment of Fig. 4 was one of the stationary parts, the film which receives the image formed at O' in Fig. 5 must either be assumed to rotate with the light source, or preferably, means must be provided whereby the image at O' may be projected on to stationary film through a device which eliminates the rotation of the image.

Figure 6:
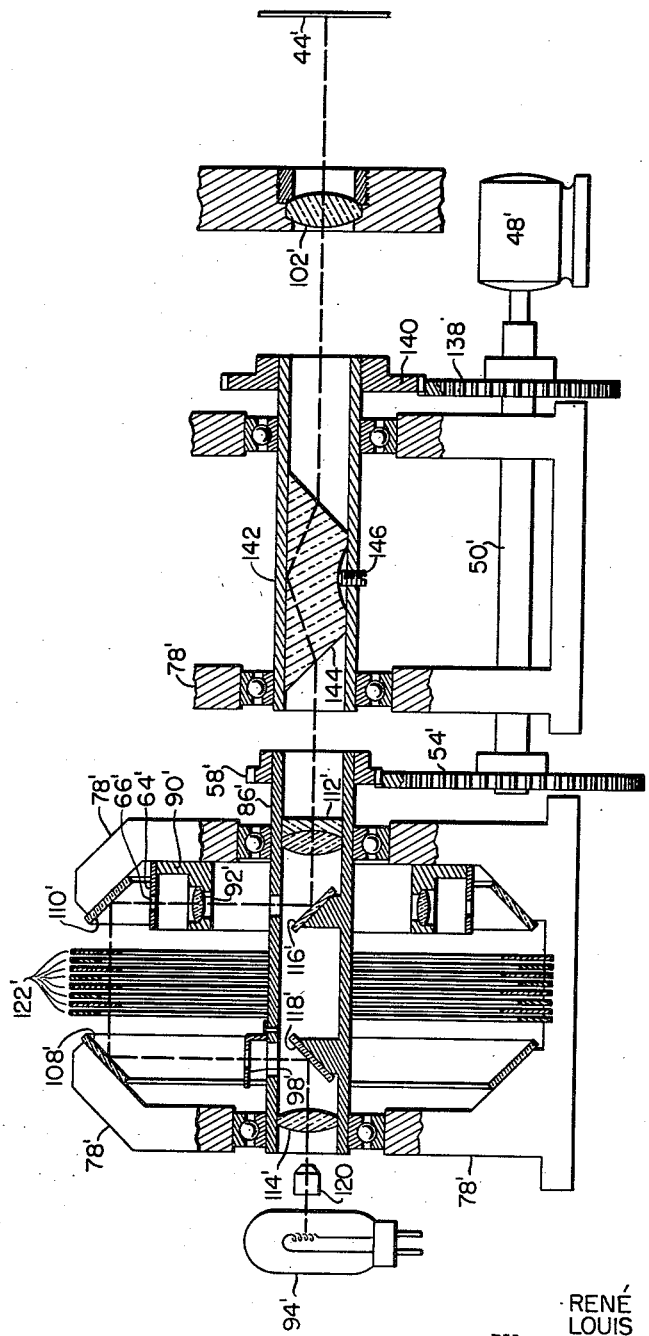
Fig. 6 is a side elevation, partly in section, of an alternative embodiment of the invention based upon Fig. 5.

An embodiment of the invention based upon Fig. 5 is shown in Fig. 6. A motor 48' drives a shaft 50', to which is pinned a gear 54' meshing with a gear 58'. The gear 58' is secured to a hollow shaft 86', inside of which are secured a pair of lenses 112' and 114', and a pair of reflectors 116' and 118'. The light from a source 94' is projected through a condenser 120' and the lens 114' to the reflector 118', which projects it through the movable aperture 98' (which corresponds to the aperture 98 of Fig. 1), and causes the beam to revolve in the same manner as in the previously described embodiment. The frame of the machine 78' has extensions supporting annular reflectors 108' and 110' having conical reflecting surfaces. (It will be noted that these conical reflectors may also be used, if desired, in the embodiment of Fig. 1 in place of the rotating reflectors 108 and 110, and also that the reflectors 108' and 110' of Fig. 6 may be replaced by rotating reflectors of the type shown in Fig. 1.) The code disks 122' operate in exactly the same manner as previously described with reference to Figs. 1 and 2.

The character drum 64' and the lens support 90' are secured directly to the frame 78'. The decoder "gates" the light beam through the selected character and a real image of the character is formed upon the reflector 116'. The lens 112' is placed at a distance from the reflector 116' equal to its focal length, so that the light emerging therefrom is parallel.

The light then impinges upon a so-called "dove prism" 144. This prism is continuously rotated about the axis of the shaft 86' through gears 138 and 140. The gear 140 is secured to a hollow shaft 142 rotatably supported in the frame 78'. The prism is secured inside the shaft by a set screw 146, or in any other suitable manner. The gear ratios are such that the shaft 142 rotates in the same direction as the shaft 86', and at half the speed of this shaft. The properties of a dove prism are well understood in the optical art, and are such that it rotates an image transmitted through it at twice its own speed of rotation. Thus, the image transmitted through the lens 112' will have a component of rotation imparted to it equal and opposite to that which it already possesses, with the result that the image at 44' is stationary. A lens 192' is placed at its focal distance from the point 44' to focus the parallel light thereon. Parallel light is passed through the prism 144 in order to reduce any optical aberrations which may be created therein.

In either of the above-described embodiments of this invention, it is necessary for each lens on the lens support to focus an image of its corresponding character, real or virtual, at a particular point in the axis about which the parts are rotated. This requirement may be met by the exercise of appropriate care in mounting each of the lenses 92 (Fig. 1) or 92' (Fig. 6) in the lens support. However, a considerable saving in labor and cost may be brought about by merely aligning each lens approximately in its correct position, and by then disposing each character upon the character support in a position which compensates for any errors introduced by the lens. The latter method will be described below with reference to Figs. 7 to 10.

Figure 7:
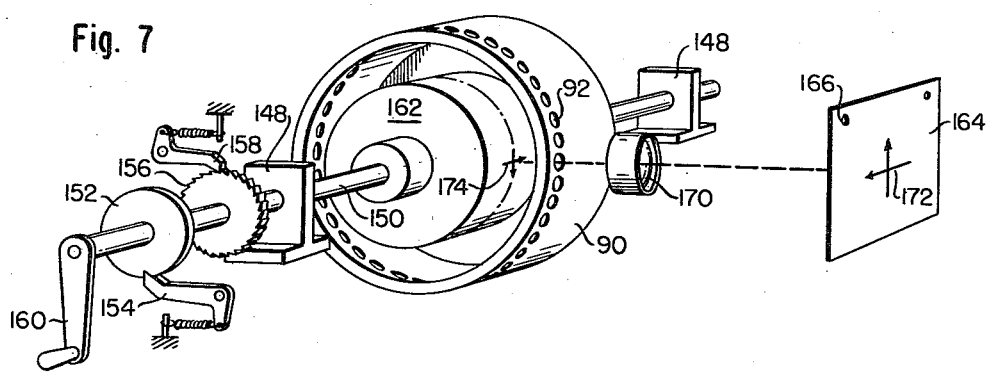
Fig. 7 is an oblique view illustrating a method for preparing a character support for use in the practice of the invention.

Referring to Fig. 7, we provide a pair of fixed supports, 148 for a rotatable shaft 150. The shaft is provided near its left extremity with a notched wheel 152 cooperating with a pawl 154 and a ratchet wheel 156 cooperating with a pawl 158. A crank handle 160 at the end of the shaft is used for turning it, the pawl 158 being lifted free of the wheel 156 when it is desired to turn the shaft non-intermittently for a full revolution, and the pawl 154 being lifted when it is desired to move the shaft intermittently by distances corresponding to the angle subtended between adjacent lenses 92, as hereinbefore described. The support 90 is rigidly secured to the shaft 150, as is also a test drum 162.

In the first step of the preferred process the test drum 162 is coated with a photosensitive emulsion. A fixed sheet 164 is placed in front of a fixed lens 170. The sheet has a pair of holes 166 for locating its position accurately upon pegs 168, these pegs forming a part of a supporting structure shown in Fig. 10 and hereinafter more fully described. With the pawl 158 lifted, the test drum and the lens support are rotated in unison through a complete revolution, the sheet 164 being illuminated, thus causing a pair of reference marks 172 on the sheet to be projected successively through each of the lenses 92, whereby the images of the marks are focused upon the surface of the drum 162. Each of the individual images of the reference marks will be stationary as projected upon the drum 162 for the reasons given above with reference to Fig. 4.

Figure 8:
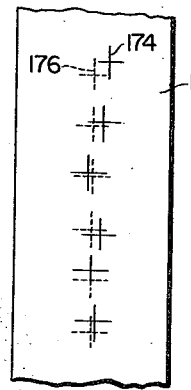
Fig. 8 is a fragmentary developed view of the surface of the test drum prepared in the apparatus of Fig. 7.
Figure 10:
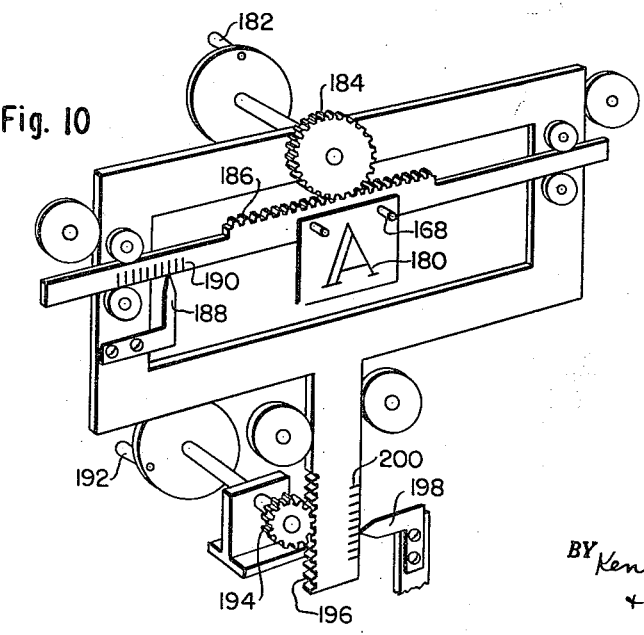
Fig. 10 is an oblique view illustrating apparatus for adjusting the individual characters for deviations in alignment of their respective lenses.

Due to slight variations in the individual alignment of the lenses 92, the images 174 will not be in perfect alignment. Fig. 8 is a developed view of the surface of the drum 162, showing how each image such as 174 is displaced from the position corresponding to perfect alignment as shown at 176 in dotted lines. However, since each of the images 174 would be projected back to the same position on the sheet 164 by its corresponding lens, its position in Fig. 8 indicates the desired position of the character to be formed upon the character drum for projection by this lens. Accordingly, the remaining steps in this method have as their object to dispose each of the characters on the character drum in a position deviating from the position corresponding to perfect alignment in the same manner as do the corresponding reference mark images on the test drum.

Figure 9:
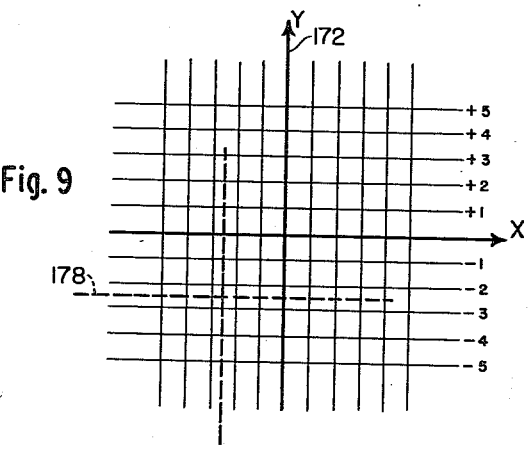
Fig. 9 is a diagram illustrating the method of recording the corrections for deviation in lens alignment.

To this end, the next step is to remove the lens support 90 and to refocus the lens 170, or substitute another lens therefor, so that the developed images 174 may be focused directly upon the sheet 164. With the pawl 154 lifted, the drum 162 is advanced one tooth of the wheel 156 at a time, thus presenting one of the images 174 at a time in position to be projected to the sheet 164. The sheet 164 is preferably ruled as shown in Fig. 9. The marks 174 for a representative lens form an image 178, shown as dotted lines, the deflection of which may be measured in each of two dimensions. In this manner, a "correction record" may be prepared, on which an $x$-deflection and a $y$-deflection can be recorded for each of the lenses 92. The support 90 may be marked with numbers adjacent to each lens for the purpose of identifying the corresponding correction readings.

The final step is to substitute the character drum on the shaft 150 for the test drum 162 and to project each of the characters on to the character drum from the same position as the sheet 164. The diameter of the test drum is the same as the diameter of the character drum. The apparatus utilized in this step is the same as that used in the preceding step, the lens 170 being adjusted to focus the images of the various characters 180, which have been substituted for the sheet 164, directly upon the character drum. Before each character is projected, it is given a deflection in each dimension as indicated by the correction readings for the corresponding lens. To this end, the support for the sheet 164 and the various characters 180 are mounted upon the device shown in Fig. 10. A hand crank 182 through a gear 184 and rack 186 controls horizontal deflection, as read by a horizontally fixed pointer 188 upon a scale 190. Similarly, a hand crank 192 through a gear 194 and rack 196 controls vertical displacement, as indicated by a vertically fixed pointer 198 on a scale 200.

One of the principal advantages of the foregoing method relates to the problem of the manufacturer of the composing machine in supplying a replacement character drum or a drum with different styles or fonts of characters to a user who retains possession of the lens support 90, the lens support therefore being unavailable when the character support is made. To this end, the above method permits the preparation of a test drum 162 at the time when the original lens support 90 is made, and this test drum is then used to prepare a correction record for each of the lenses on the drum. Character drums may be made directly from this record, which may be preserved by the manufacturer. Once the record is prepared the test drum may be destroyed or used for other purposes. If desired, the test drum 162 may itself be preserved at the factory in case the need for preparing a record should later materialize. It will be clear, of course, that where the lens support itself is available when the character drum is prepared, a simpler alternative method is available. By this method, the characters are projected in one step similar to the first step described above. In place of a test drum 162 the character drum itself is mounted upon the shaft 150. Each of the characters 180 is then projected through its corresponding lens on to the character drum in the same manner as the images 174 in said step. The required deflection corresponding to the lens associated with each character will be automatically produced.

It will be understood that while the invention has been described with reference to certain specific embodiments thereof, numerous variations and arrangements of the parts and details and modifications of construction may be effected without departing from the spirit or scope of the invention. A number of such alternative arrangements and modifications have been suggested above, and others will occur to those skilled in this art.

Having thus described the invention, we claim:

1. Photographic type composing apparatus comprising the combination of a continuously rotating support bearing the characters to be photographed and a lens for each character in fixed relation thereto, the characters being arranged in a circle having its center in the axis of rotation and each lens being adapted to form a virtual image of a corresponding character in said center, a fixed light source in position to illuminate a character crossing a fixed line passing through said center and to cause a virtual image thereof to be formed in said center, means to support a stationary sensitized sheet in position to receive the light through said character and the corresponding lens, and optical means to refocus said image on the sheet.

2. Photographic type composing apparatus comprising the combination of a continuously rotating support bearing the characters to be photographed and a lens for each character in fixed relation thereto, the characters being arranged in a circle having its center in the axis of rotation and each lens being adapted to form a virtual image of a corresponding character in said center, a light source in said center to illuminate a character crossing a fixed line passing through said center and to cause a virtual image thereof to be formed in said center, means to support a stationary sensitized sheet in position to receive the light through said character and the corresponding lens, and optical means to refocus said image on the sheet.

3. Photographic type composing apparatus comprising the combination of a fixed support bearing the characters to be photographed and a lens for each character in fixed relation thereto, the characters being arranged in a circle and each lens being adapted to form a real image of a corresponding character in the center of said circle, a source for a light beam rotating continuously about an axis passing through said center and having provision to illuminate a character on a unique radius of said circle and to cause a real image thereof to be formed in said center, a reflector rotating in synchronism with the light beam to reflect the light passing through said character and the corresponding lens into the axis of rotation, means to support a sensitized sheet to receive the light from the reflector, optical means to refocus said image on the sheet, and means for optically eliminating the motion of the reflected image due to said rotation.

4. Photographic type composing apparatus comprising the combination of a fixed support bearing the characters to be photographed and a lens for each character in fixed relation thereto, the characters being arranged in a circle and each lens being adapted to form a real image of a corresponding character in the center of said circle, a source for a light beam rotating continuously about an axis passing through said center and having provision to illuminate a character on a unique radius of said circle and to cause a real image thereof to be formed in said center, a reflector disposed with said character in its surface and rotating in synchronism with the light beam to reflect the light passing through said character and the corresponding lens into the axis of rotation, means to support a sensitized sheet to receive the light from the reflector, optical means to refocus said image on the sheet, and means for optically eliminating the motion of the reflected image due to said rotation.

5. Photographic type composing apparatus comprising the combination of a fixed support bearing the characters to be photographed and a lens for each character, the characters being arranged in a circle and each lens being adapted to form a real image of a corresponding character in the center of said circle, a continuously rotating light source having provision to illuminate a character on a unique radius of said circle and to cause a real image thereof to be formed in said center, a reflector rotating in synchronism with the light source to reflect the light passing through said character and the corresponding lens into the axis of rotation, means to support a sensitized sheet to receive the light from the reflector, optical means to refocus said image on the sheet, and a dove prism rotating at half the speed of the light source to eliminate the motion of the reflected image due to said rotation.

6. Photographic type composing apparatus comprising the combination of a continuously rotating support bearing the characters to be photographed and a lens for each character in fixed relation thereto, the characters being arranged in a circle having its center in the axis of rotation and each lens being adapted to form a virtual image of a corresponding character in said center, a fixed reflector in said center to reflect light directed along said axis to a line passing through said circle and to illuminate a character crossing said line, causing a virtual image thereof to be formed in said center, means to support a stationary sensitized sheet in position to receive the light through said character and the corresponding lens, optical means to refocus said image on the sheet, a light source having provision to project a beam of light continuously along said axis, and decoder means under the control of a keyboard to interrupt said beam except when it is reflected through a selected character.

7. Photographic type composing apparatus comprising the combination of a fixed support bearing the characters to be photographed and a lens for each character in fixed relation thereto, the characters being arranged in a circle and each lens being adapted to form a real image of a corresponding character in the center of said circle, a light source having provision to direct a beam of light toward said center and to rotate said beam continuously about said center, said beam illuminating a character crossed thereby and causing a real image thereof to be formed in said center, a reflector rotating in synchronism with the beam to reflect the light passing through said character and the corresponding lens into the axis of rotation, means to support a sensitized sheet to receive the light from the reflector, optical means to refocus said image on the sheet, means for optically eliminating the motion of the reflected image due to said rotation, and decoder means under the control of a keyboard including means for interrupting the rotating beam except when it passes through a selected character.

8. A method for preparing a character drum for photographic type composing apparatus wherein each character has a separate lens, comprising the steps of projecting an image of fixed reference marks successively through each character lens upon the sensitized surface of a test drum, projecting each reference mark image after development through a fixed lens upon a fixed scale and measuring and recording the deviation thereof from fixed axes on the scale, and projecting an image of each character through a fixed lens upon a sensitized surface of the character drum, said character being supported at the same deviation from fixed axes as was recorded in the preceding step for its corresponding lens.

9. Photographic type composing apparatus comprising the combination of a support bearing the characters to be photographed and a lens for each character in fixed relation thereto, the characters and lenses being arranged in circles about a fixed axis, each lens being adapted to form an image of its corresponding character at a common point in said axis and in a plane including said axis, a source for a light beam, mechanism for rotating said beam and characters relatively about said axis whereby the characters are successively illuminated, a support for a sensitized sheet, optical means to focus said image on said sheet, and means to interrupt said beam except when it passes through a selected character.

10. Photographic type composing apparatus comprising the combination of a support bearing the characters to be photographed and a lens for each character in fixed relation thereto, the characters and lenses being arranged in circles about a fixed axis, each lens being adapted to form an image of its corresponding character at a common point in said axis and in a plane including said axis, a source for a light beam, mechanism for rotating said beam and characters relatively about said axis whereby the characters are successively illuminated, a support for a sensitized sheet, optical means to focus said image on said sheet, and decoder means under the control of a keyboard to interrupt said beam except when it passes through a selected character.

11. Photographic type composing apparatus comprising the combination of a support bearing the characters to be photographed and a lens for each character in fixed relation thereto, the characters and lenses being arranged in circles about a fixed axis, each lens being adapted to form an image of its corresponding character at a common point in said axis and in a plane including said axis, a source for a light beam, mechanism for rotating said beam and characters relatively about said axis whereby the characters are successively illuminated, a support for a sensitized sheet, optical means to focus said image on said sheet, means to interrupt said beam except when it passes through a selected character, and an aperture supported in position to limit the light reaching each character, said aperture having a relatively narrow dimension in the direction of relative motion of the beam and character.

12. Photographic type composing apparatus comprising the combination of a support bearing the characters to be photographed and a lens for each character in fixed relation thereto, each lens being adapted to form a virtual image of its corresponding character in a common optical point, means to illuminate a selected character to cause a virtual image thereof to be formed in said point, a support for a sensitized sheet, and optical means adapted to receive the light from the illuminated character through its corresponding lens and to project a real image of the character onto the sheet.

13. A method for preparing a character support for photographic type composing apparatus wherein each character has a separate lens, comprising the steps of projecting an image of fixed reference marks successively through each character lens upon the sensitized surface of a test support, projecting each reference mark image after development through a fixed lens upon a fixed scale and measuring and recording the deviation thereof from fixed axes on the scale, and projecting an image of each character through a fixed lens upon a sensitized surface of the character support, said character being supported at the same deviation from fixed axes as was recorded in the preceding step for its corresponding lens.

References Cited in the file of this patent

UNITED STATES PATENTS

| | | |
|---|---|---|
| 1,776,527 | Uher | Sept. 23, 1930 |
| 2,180,417 | Huebner | Nov. 21, 1939 |
| 2,211,320 | Efron | Aug. 13, 1940 |
| 2,346,251 | Bryce | Apr. 11, 1944 |